(12) United States Patent
Hummert et al.

(10) Patent No.: US 6,885,535 B2
(45) Date of Patent: Apr. 26, 2005

(54) NON-LINEAR SNUBBER CIRCUIT

(75) Inventors: George Hummert, South Aiken, SC (US); Russell W. King, Evans, GA (US)

(73) Assignee: Club Car, Inc., Evans, GA (US)

( * ) Notice: Subject to any disclaimer, the term of this patent is extended or adjusted under 35 U.S.C. 154(b) by 471 days.

(21) Appl. No.: 09/766,548

(22) Filed: Jan. 19, 2001

(65) Prior Publication Data

US 2001/0033500 A1 Oct. 25, 2001

Related U.S. Application Data

(60) Provisional application No. 60/176,998, filed on Jan. 19, 2000.

(51) Int. Cl.$^7$ .................................................. H02H 9/00
(52) U.S. Cl. .......................... 361/118; 361/23; 361/24; 361/56; 361/111
(58) Field of Search ............................ 361/23, 24, 25, 361/18, 111, 113, 118, 91.1, 56, 15, 2

(56) References Cited

U.S. PATENT DOCUMENTS

| | | | |
|---|---|---|---|
| 4,275,430 A | * | 6/1981 | Seki et al. .................. 361/91.7 |
| 4,678,932 A | | 7/1987 | Tanaka et al. ............... 327/940 |
| 4,697,219 A | | 9/1987 | Mitsuoka ...................... 363/51 |
| 4,745,513 A | * | 5/1988 | McMurray .................... 361/56 |
| 5,339,210 A | * | 8/1994 | Howell .......................... 361/9 |
| 5,615,094 A | | 3/1997 | Cosentino et al. .......... 361/91.7 |
| 5,986,904 A | | 11/1999 | Jacobs et al. ................ 363/126 |

OTHER PUBLICATIONS

V. Lakshminarayanan, Centre for Development of Telematics, "Techniques Minimize Switching–Device Failures In Inductive Circuits", EDN, Jan. 20, 2000, pp. 59–65.

* cited by examiner

Primary Examiner—Stephen W. Jackson
(74) Attorney, Agent, or Firm—Michael Best & Friedrich LLP

(57) ABSTRACT

A control circuit for a motor including a contactor circuit having a contactor, a first end and a second end, and a snubber circuit connected across the contactor circuit. The snubber circuit includes a first port electrically connected to the first end of the contactor circuit, a second port electrically connected to the second end of the contactor circuit, a first sub-circuit electrically connected to one of the first and second ports, and a second a second sub-circuit electrically connected in series with the first sub-circuit and to the other of the first and second ports. The first sub-circuit includes a resistor and a first non-linear device electrically connected in parallel branches, and the second sub circuit includes an energy storage device and a second non-linear device electrically connected in parallel branches.

40 Claims, 2 Drawing Sheets

NON-LINEAR SNUBBER CIRCUIT

This application claims the benefit of prior filed co-pending provisional patent application titled NON-LINEAR SNUBBER CIRCUIT, Ser. No. 60/176,998, filed on Jan. 19, 2000.

BACKGROUND OF THE INVENTION

The present invention relates to electronic circuits having one or more contactors and, particularly, to supplemental circuits for dissipating or preventing arcing across such contactors.

In certain DC circuits, it is necessary to include a device to interrupt the flow of current through the circuit. One device for accomplishing current interruption is called a "contactor." The contactor includes a set of electrical contacts where at least one of which is movable. For example, electrical circuits connecting a power supply (e.g., a battery) to an electric motor typically include a solenoid-driven contactor or "solenoid" to start and stop the motor by permitting and interrupting current flow through the circuit and, thus, to the motor.

In general, contactors permit current flow between the contacts when contact surfaces thereof are abutted together (i.e., the contactor is "closed"). Additionally, current flow is terminated or prevented when the contacts are moved away from each other to spaced apart locations (i.e., the contactor is "open"). In other words, separation of the previously closed contacts breaks the continuous conduction path and creates an opening in the circuit. However, the current does not immediately cease flowing across the contactor. Rather, an "arc" or discharge of current occurs across the gap between the opening contact surfaces. The arc or discharge occurs due to the following two conditions. First, stored energy in an inductive DC circuit prohibits an instantaneous change in current and causes a sharp voltage rise between the contacts upon opening. The sharp voltage rise forces the current to "jump the gap" between the contacts. Second, as the last portion of the surface of the contactor is breaking, localized current concentration causes the contact material to melt creating a metallic plasma that carries the arc current as the contact surfaces continue to separate.

Typically, both of the above-discussed factors occur substantially simultaneously during a typical contact opening. The net result is an arc characterized by a sharply rising voltage waveform between the contacts. During the opening period of about one millisecond, the voltage rises to tens or hundreds of volts.

Arcing is undesirable because it causes erosion and pitting of the contacts of the contactor. Eventually erosion and pitting cause failures. Either the contacts fail to abut together or touch (referred to as a "no make" condition) or they become stuck together (i.e., become "welded contacts"). Of the two possible failure modes, the welded contacts condition is often more serious since, thereafter, the contactor is incapable of interrupting the circuit.

SUMMARY OF THE INVENTION

Known snubber circuits use liner combinations of resistors in series with a capacitor to absorb shunt current. However, such a series resistance limits the effectiveness of the shunt path around the contactor. Therefore, when the contactor opens, it would be beneficial to direct current flow around the series resistors and have the current directly charge the capacitor. In addition, when the contactor closes and the capacitor discharges, it would be beneficial to use a resistor to control discharge of the capacitor. Controllably discharging the capacitor helps to prevent or minimize arcing when the contactors close.

Accordingly, in one embodiment of the invention, the invention provides a control circuit for controlling a motor. The control circuit includes a contactor circuit including a contactor. A snubber circuit is connected across the contactor circuit. The snubber circuit includes a first port electrically connected to a first end of the contactor circuit, a second port electrically connected to a second end of the contactor circuit, a first sub-circuit electrically connected to one of the first and second ports, and a second sub-circuit electrically connected in series with the first sub-circuit and to the other of the first and second ports. The first sub-circuit includes a resistor and a non-linear device electrically connected in parallel branches and the second sub-circuit includes an energy storage device. In another embodiment of the invention, the second sub-circuit further includes a second non-linear device, and the capacitor and the second non-linear device are electrically connected in parallel branches.

In another embodiment, the invention includes a vehicle (e.g., a golf cart) having an electric motor and a control circuit operable to control the electric motor. The control circuit includes a contactor circuit having a contactor and a non-linear snubber circuit of the invention connected across the contactor circuit.

Other features and advantages of the invention will become apparent to those skilled in the art upon review of the following detailed description, claims, and drawings.

BRIEF DESCRIPTION OF THE DRAWINGS

FIG. 1 is a schematic view of a non-linear snubber circuit in accordance with one embodiment of the invention.

DETAILED DESCRIPTION

Figure 2:
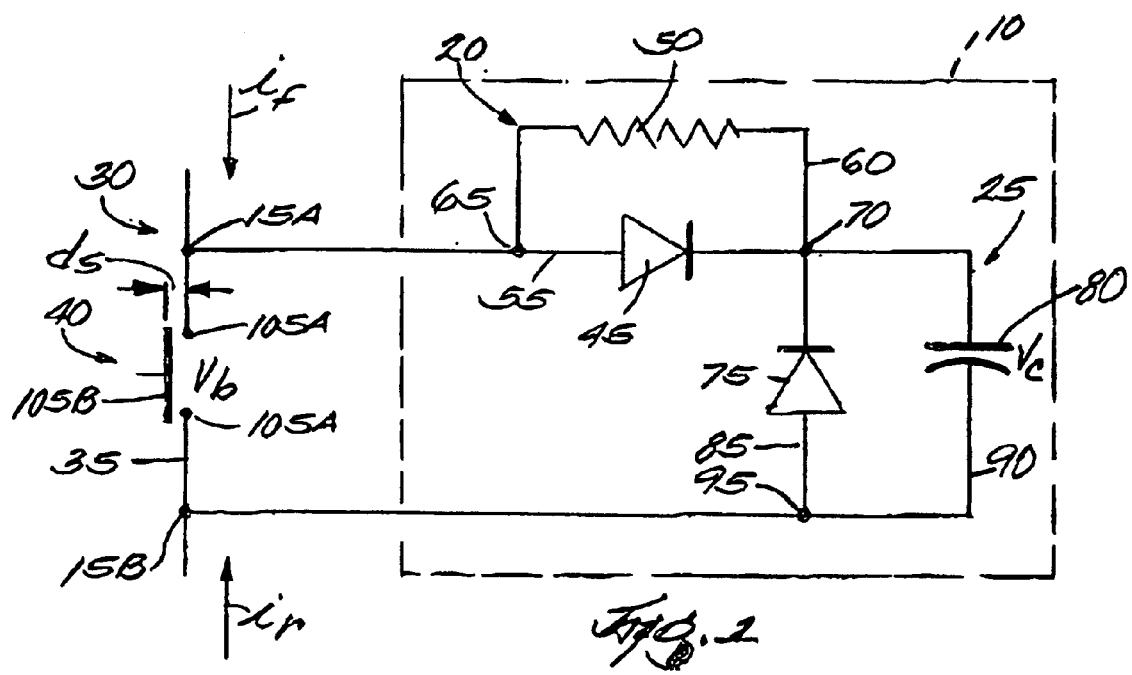
FIG. 2 is a schematic view of a vehicle having a motor and a control circuit including the non-linear snubber circuit.

Before embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

A snubber circuit 10 of one embodiment is shown in FIG. 1. The snubber circuit 10 includes first and second ports 15A and 15B, and first and second circuit loops 20 and 25, respectively, connected in series between the ports 15A and 15B. The ports 15A and 15B are connected in circuit in a primary or control circuit 30 (see also FIG. 3). Specifically, the ports 15A and 15B are electrically connected at opposing ends of a contactor circuit 35. The contactor circuit 35 includes a contactor 40 (see also FIG. 2) and is electrically connected in parallel with the snubber circuit 10.

As best shown in FIG. 1, the first circuit loop 20 includes a first diode 45 and a resistor 50. The first diode 45 and the resistor 50 are disposed in parallel, first and second branches 55 and 60, respectively, between a first node 65 and a second node 70. The second circuit loop 25 includes a second diode 75 and an energy storage device such as a capacitor 80. The second diode 75 and the capacitor 80 are disposed in parallel, third and fourth branches 85 and 90, respectively, between the second node 70 and a third node 95. As depicted in FIG. 1, the two diodes 45 and 75 are oppositely oriented so as to permit flow in opposing directions through the snubber circuit 10. More specifically, current flowing in a first or forward direction if flows through the first diode 45, but not through the second diode 75, and current flowing in a second or reverse direction $i_r$ flows through the second diode 75 and not the first diode 45.

Figure 3:
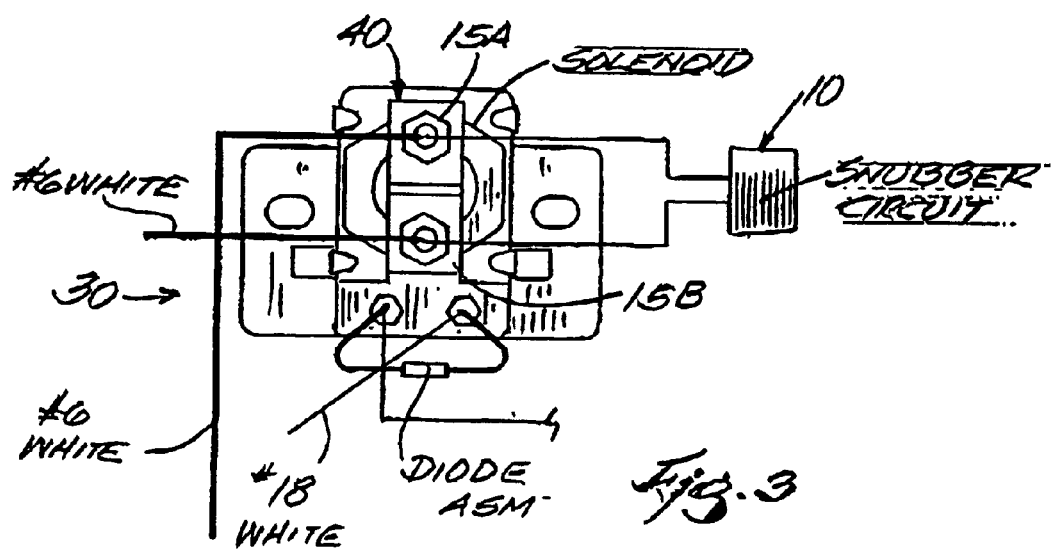
FIG. 3 is an enlarged view of a designated portion of FIG. 2, showing the solenoid contactor and the non-linear snubber circuit.
Figure 2:
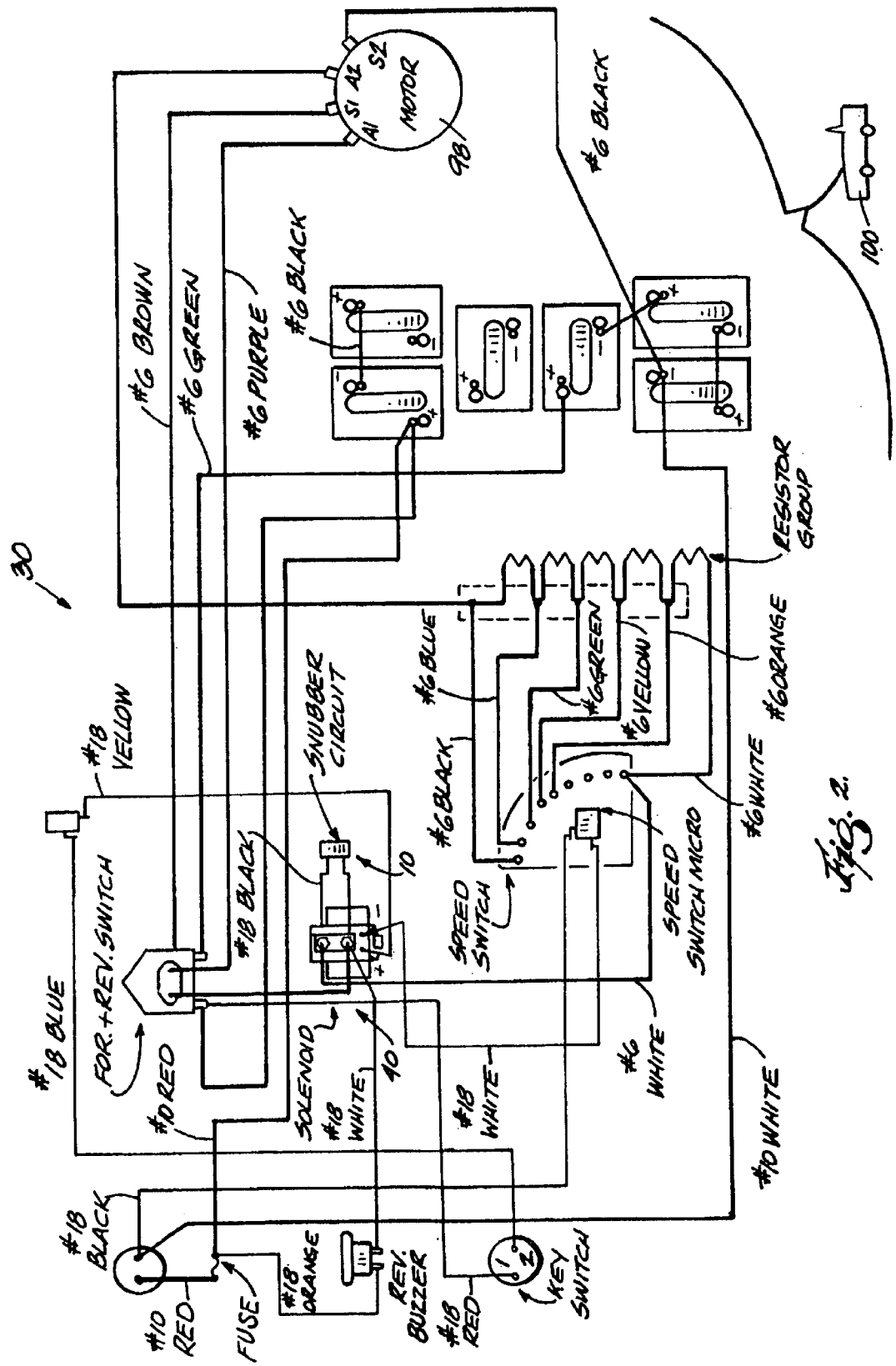

As shown in FIGS. 1, 2 and 3, the snubber circuit 10 is used to prevent arcing of a solenoid contactor 40 in a control circuit 30. The control circuit is used to drive a motor 98 of a vehicle 100 (e.g., a golf cart). For example, the snubber circuit 10 and control circuit 30 may be integrated into any one of the battery-operated CLUB CAR® golf cars (manufactured by Club Car, Inc. of Augusta, Ga.) available at the time of filing the present application. The control circuit 30 has a system voltage of about thirty-six (36) volts that is supplied by six commercially available batteries connected in series. The solenoid contactor 40 is intended to operate with a maximum interrupt current through the solenoid contactor of fifty (50) amperes with a contact opening time of about one (1) millisecond. Without the snubber circuit 10, arcing occurs when the voltage across the contacts 105A and 105B of the solenoid 40 is greater than about twenty-five (25) volts. Further, the solenoid contactor 40 may be a commercially available starter solenoid (e.g., a Rogers White 120-20).

With the above-stated operating values of the control circuit 30, the components for one embodiment of the snubber circuit 10 are as follows. The resistor 50 is a commercially available resistor having a resistance rating of about forty-seven (47) ohms. The capacitor 80 is a commercially available capacitor having a capacitance rating of about four hundred seventy (470) microfarads. Further, the first and second diodes are each preferably commercially available diodes rated at about six (6) amperes. With the above-specified components/operating parameters of the non-linear snubber circuit 10 and the control circuit 30, the maximum voltage at the contact opening should be less than about five (5) volts, which is not sufficient for arcing to occur across the contacts 105A and 105B of the solenoid contactor 40.

A. Arc-suppressive Function

With the above-described construction of the snubber circuit 10, current flowing in the forward direction if passes through the snubber circuit 10 in the following manner. At the instant the contactor 40 begins to open, current flowing in the forward direction if enters the first port 15A, flows into the first node 65 and through the first branch 55 having the first diode 45. The current flows through the first diode 45, rather than through the second branch 60 and resistor 50, due to the significantly lower resistance of the diode 45. Continuing on, the forwardly directed current passes through the second node 70 and into the capacitor 80 of the fourth branch 90. The forward directed current flows into the capacitor 80 due to the arrangement of the second diode 75 blocking current flow in the forward direction if. The current flow into the capacitor 80 causes the capacitor 80 to charge, thereby increasing the voltage $v_c$ of the capacitor 80.

Simultaneously with the charging of the capacitor 80 and corresponding increase in the voltage $v_c$ across the capacitor 80, the voltage across the contacts 105A and 105B, called the "breakdown voltage" $v_b$, increases as the contacts 105A and 105B move apart to increase the separation distance $d_s$.

Successful arc suppression is achieved when the capacitor voltage $v_c$ increases at a lesser or slower rate than the rate of increase of the breakdown voltage $v_b$ between the contacts 105A and 105B. Should the capacitor voltage $v_c$ increase at greater or quicker rate than the breakdown voltage $v_b$ between the contacts 105A and 105B, an arc may form between the contacts 105A and 105B, defeating the functional purpose of the snubber circuit 10.

The capacitor value (i.e., its capacitance) is selected to be of a sufficient magnitude to ensure that the rate of increase of the capacitor voltage $v_c$ of the contactor 40 is less than the rate of increase of the breakdown voltage $v_b$. The function of the first diode 45 is to allow current to bypass the resistor 50, which is designated as the "discharge" resistor 50 for reasons discussed below. Without the first diode 45, the resistance of the resistor 50 decreases the current flow into the capacitor 80. This decrease in current flow causes the rate of voltage increase in the capacitor 20 to be greater than the rate of increase of the breakdown voltage $v_b$ during contactor opening. This may lead to contactor arcing.

B. Capacitor Discharge

After the capacitor 80 has absorbed the energy of the inductive load in the control circuit 30, the energy must be discharged to allow the capacitor 80 to absorb additional energy arising due to subsequent openings of the contactor 40. Therefore, when the contacts 105A and 105B are next closed, the capacitor 80 "discharges" the electrical energy stored in the capacitor 80 by a flow of current through the resistor 50.

The resistor 50 and the capacitor 80 are selected so that the RC time constant of the series path through branches 90 and 60 of the snubber circuit 10 is sufficiently rapid to fully discharge the capacitor 80 before the contactor 40 next opens or "re-opens." However, the RC time constant must be of sufficient duration to prevent or minimize arcing through the closing contacts 105A and 105B when the electrical energy discharges from the capacitor 24. Thus, the primary criterion for selecting the resistor 50 is to have a resistance rating that provides a suitable RC time constant. In addition, the selecting of the resistor 50 also is a factor in selecting the capacitance rating of the capacitor 80.

B. Cleaning of Contacts by Arcing

During normal use of a contactor 40, the contacts 105A and 105B typically experience an accumulation or "build-up" of a thin layer of carbon (not depicted) on the contact surfaces. Such a carbon layer increases the resistance at the interface between the contacts 105A and 105B when the contactor 40 is closed. With an increased resistance, the temperature at the contacts 105A and 105B increases (i.e., from $ri^2$ losses), particularly when a high or heavy current flows through the control circuit 30. The increase in resistance may lead to the inability of the control circuit 30 to pass sufficient current through the contactor 40. In addition, the increase in resistance may also lead to failure of the contactor 40 due to extreme heat rise.

With the above-described construction of the non-linear snubber circuit 10, current flowing in the reverse direction $i_r$ through the control circuit 30 causes a reverse flow of current through the snubber circuit 10 that bypasses the capacitor 80. The reverse flow of current bypasses the capacitor due to the presence of the second diode 75. Specifically, current flowing in the reverse direction $i_r$ enters the second port 15B of the snubber circuit 10, flows through the second diode 75 of the third branch, and through the resistor 50. For vehicle applications, current may flow through the control circuit 30 in the reverse direction $i_r$ when the vehicle 100 is powered in the "reverse" direction.

By flowing through the resistor 50, the rate of increase of the voltage $v_b$ across the contacts 105A and 105B is lesser or slower than the rate of voltage increase across the resistor 50. Therefore, arcing occurs across the contacts 105A and 105B when the contactor 40 breaks current flow in the reverse direction $i_r$.

In the vehicle application, current does not flow in the reverse direction $i_r$ as often as current flows in the forward direction $i_f$ (i.e., the vehicle is more often driven in the forward direction). In addition, the current flow in the reverse direction $i_r$ is usually at a lower voltage potential. Specifically, the current flow in the reverse direction is about one-half of the voltage of the control circuit 30 in the forward direction (i.e., about eighteen (18) volts). The two preceding factors make arcing across the contacts 105A and 105B in the reverse direction more beneficial than harmful. The primary benefit of such arcing in the reverse direction is that the arcing either removes carbon film on contacts 105A and 105B or decreases the rate of buildup of such film.

In addition, in some embodiments of the invention, the capacitor 80 may be a polar capacitor (e.g., an electrolytic capacitor.) For those embodiments, another purpose of the second diode 75 is to prevent a damaging reverse voltage from appearing across the polar capacitor 80. By having the second diode 75 in the non-linear snubber circuit 10, current flowing through the snubber circuit 10 in the reverse direction $i_r$ flows through the second diode 75 and bypasses the capacitor 80 (as discussed above). This allows only a small reverse voltage drop (e.g. seven-tenths (0.7) of a volt) to appear across the capacitor 80.

In the embodiment described, the snubber circuit 10 provides a non-linear circuit path of energy absorption versus energy discharge. This non-linear path optimizes an energy absorption response to ensure minimal arcing during opening of the contactor 40. During closure of the contactor 40, the circuit path is optimized for controlled energy discharge to minimize contactor arcing as well. Another unique feature of the snubber circuit 10 is that the circuit configuration or design allows contactor arcing to occur during reverse current flow through the contactor 40. As discussed above, a certain amount of arcing is desirable to provide cleaning of the contacts 105A and 105B when the contactor 40 breaks current flowing through the control circuit 30 in the reverse direction $i_r$.

As can be seen from the above, the invention provides supplemental circuits for dissipating or preventing arcing across contactors. Various features and advantages of the invention are set forth in the following claims.

What is claimed is:

1. A control circuit for controlling a motor, the control circuit comprising:
    a contactor circuit including a contactor and having first and second ends; and
    a snubber circuit connected across the contactor circuit, the snubber circuit including
        a first port electrically connected to the first end of the contactor circuit,
        a second port electrically connected to the second end of the contactor circuit,
        a first sub-circuit electrically connected to one of the first and second ports, the first sub-circuit including a resistor and a non-linear device electrically connected in parallel branches,
        a second sub-circuit electrically connected in series with the first sub-circuit and to the other of the first and second ports, the second sub-circuit including an energy storage device and a second non-linear device, the energy storage device and the second non-linear device are electrically connected in parallel branches.

2. A control circuit as set forth in claim 1 wherein the non-linear device includes a diode.

3. A control circuit as set forth in claim 1 wherein the energy storage device includes a capacitor.

4. A control circuit as set forth in claim 1 wherein the snubber circuit receives a first current flowing from the first port through the first and second sub-circuits to the second port, and wherein a substantial portion of the first current flows through the non-linear device when the first current flows through the first sub-circuit.

5. A control circuit as set forth in claim 4 wherein the energy storage device charges when the first current flows through the second sub-circuit.

6. A control circuit as set forth in claim 5 wherein the energy storage device discharges when the contactor is closed, wherein the energy discharged from the energy storage device creates a second current that flows through the first sub-circuit opposite the first current, and wherein a substantial portion of the second current flows through the resistor when the second current flows through the first sub-circuit.

7. A control circuit for controlling a motor, the control circuit comprising:
    a contactor circuit including a contactor and having first and second ends;
    a snubber circuit connected across the contactor circuit, the snubber circuit including
        a first port electrically connected to the first end of the contactor circuit,
        a second port electrically connected to the second end of the contactor circuit,
        a first sub-circuit electrically connected to one of the first and second ports, the first sub-circuit including a resistor and a non-linear device electrically connected in parallel branches,
        a second sub-circuit electrically connected in series with the first sub-circuit and to the other of the first and second ports, the second sub-circuit including an energy storage device; and
    wherein the non-linear device is a first diode, wherein the second sub-circuit further includes a second non-linear device, and wherein the energy storage device and the second non-linear device are electrically connected in parallel branches.

8. A control circuit as set forth in claim 7 wherein the first and second non-linear devices each includes a diode, and wherein the energy storage device includes a capacitor.

9. A control circuit as set forth in claim 7 wherein the snubber circuit receives a first current flowing from the first port through the first and second sub-circuits to the second port, and wherein a substantial portion of the first current flows through the first non-linear device when the first current flows through the first sub-circuit.

10. A control circuit as set forth in claim 9 wherein the energy storage device charges when the first current flows through the second sub-circuit.

11. A control circuit as set forth in claim 10 wherein the energy storage device discharges when the contactor is closed, wherein the energy discharged from the energy storage device creates a second current that flows through the first sub-circuit opposite the first current, and wherein the a substantial portion of the second current flows through the resistor when the second current flows through the first sub-circuit.

12. A control circuit as set forth in claim 9 wherein the snubber circuit receives a second current flowing from the second port through the first and second sub-circuits to the first port, and wherein a substantial portion of the second current flows through the second non-linear device when the second current flows through the second sub-circuit.

13. A control circuit for controlling a motor, the control circuit comprising:
    a contactor circuit including a contactor and having first and second ends; and a snubber circuit connected across the contactor circuit, the snubber circuit including
    a first port electrically connected to the first end of the contactor circuit;
    a second port electrically connected to the second end of the contactor circuit;
    a first sub-circuit electrically connected to one of the first and second ports, the first sub-circuit including a resistor and a first non-linear device electrically connected in parallel branches; and
    a second sub-circuit electrically connected in series with the first sub-circuit and to the other of the first and second ports, the second sub-circuit including a energy storage device and a second non-linear device electrically connected in parallel branches.

14. A control circuit as set forth in claim 13 wherein the snubber circuit receives a first current flowing from the first port through the first and second sub-circuits to the second port, wherein a substantial portion of the first current flows through the non-linear device when the first current flows through the first sub-circuit, and wherein the energy storage device charges when the first current flows through the second sub-circuit.

15. A control circuit as set forth in claim 14 wherein the energy storage device discharges when the contactor is closed, wherein the energy discharged from the energy storage device creates a second current that flows through the first sub-circuit opposite the first current, and wherein a substantial portion of the second current flows through the resistor when the second current flows through the first sub-circuit.

16. A control circuit as set forth in claim 15 wherein the first and second non-linear devices each includes a diode, and where the energy storage device includes a capacitor.

17. A control circuit for controlling a motor, the control circuit comprising:
    a contactor circuit including a contactor and having first and second ends; and
    a snubber circuit connected across the contactor circuit, the snubber circuit including
        a first port electrically connected to the first end of the contactor circuit and operable to receive a first current flow having a first direction,
        a second port electrically connected to the second end of the contactor circuit and operable to receive a second current flow having a second direction opposite the first direction,
        a first sub-circuit electrically connected to one of the first and second ports and including a resistor and a first diode electrically connected in circuit in parallel branches, the first diode being operable to allow a substantial portion of the first current to flow through the first diode when the first current flows through the first sub-circuit, and the resister being operable to allow a substantial portion of the second current to flow through the resistor when the second current flows through the first sub-circuit, and
        a second sub-circuit electrically connected in series with the first sub-circuit and to the other of the first and second ports, the second sub-circuit including a capacitor and a second diode electrically connected in circuit in parallel branches, the second diode being operable to allow a substantial portion of the second current to flow through the second diode when the second current flows through the first sub-circuit, and the capacitor charges when the first current flows through the second sub-circuit.

18. A vehicle comprising:
    a motor; and
    a control circuit operable to control the motor, the control circuit including a contactor circuit having a contactor, a first end and a second end, and a snubber circuit connected across the contactor circuit, the snubber circuit including
        a first port electrically connected to the first end of the contactor circuit,
        a second port electrically connected to the second end of the contactor circuit,
        a first sub-circuit electrically connected to one of the first and second ports, the first sub-circuit including a resistor and a non-linear device electrically connected in parallel branches,
        a second sub-circuit electrically connected in series with the first sub-circuit and to the other of the first and second ports, the second sub-circuit including an energy storage device and a second non-linear device electrically connected in parallel branches.

19. A vehicle as set forth in claim 18 wherein the non-linear device includes a diode.

20. A vehicle as set forth in claim 18 wherein the energy storage device includes a capacitor.

21. A vehicle as set forth in claim 18 wherein the snubber circuit receives a first current flowing from the first port through the first and second sub-circuits to the second port, and wherein a substantial portion of the first current flows through the non-linear device when the first current flows through the first sub-circuit.

22. A vehicle as set forth in claim 21 wherein the energy storage device charges when the first current flows through the second sub-circuit.

23. A vehicle as set forth in claim 22 wherein the energy storage device discharges when the contactor is closed, wherein the energy discharged from the energy storage device creates a second current that flows through the first sub-circuit opposite the first current, and wherein a substantial portion of the second current flows through the resistor when the second current flows through the first sub-circuit.

24. A vehicle comprising:
    a motor; and
    a control circuit operable to control the motor, the control circuit including a contactor circuit having a contactor, a first end and a second end, and a snubber circuit connected across the contactor circuit, the snubber circuit including
        a first port electrically connected to the first end of the contactor circuit,
        a second port electrically connected to the second end of the contactor circuit,
        a first sub-circuit electrically connected to one of the first and second ports, the first sub-circuit including a resistor and a non-linear device electrically connected in parallel branches, and
        a second sub-circuit electrically connected in series with the first sub-circuit and to the other of the first and second ports, the second sub-circuit including an energy storage device; and
    wherein the non-linear device is a first diode, wherein the second sub-circuit further includes a second non-linear device, and wherein the energy storage device and the second non-linear device are electrically connected in parallel branches.

25. A vehicle as set forth in claim 24 wherein the first and second non-linear devices each includes a diode, and wherein the energy storage device includes a capacitor.

26. A vehicle as set forth in claim 24 wherein the snubber circuit receives a first current flowing from the first port through the first and second sub-circuits to the second port, and wherein a substantial portion of the first current flows through the first non-linear device when the first current flows through the first sub-circuit.

27. A vehicle as set forth in claim 26 wherein the energy storage device charges when the first current flows through the second sub-circuit.

28. A vehicle as set forth in claim 27 wherein the energy storage device discharges when the contactor is closed, wherein the energy discharged from the energy storage device creates a second current that flows through the first sub-circuit opposite the first current, and wherein the a substantial portion of the second current flows through the resistor when the second current flows through the first sub-circuit.

29. A vehicle comprising:
   a motor; and
   a control circuit operable to control the motor, the control circuit including a contactor circuit having a contactor, a first end and a second end, and a snubber circuit connected across the contactor circuit, the snubber circuit including
      a first port electrically connected to the first end of the contactor circuit;
      a second port electrically connected to the second end of the contactor circuit;
      a first sub-circuit electrically connected to one of the first and second ports, the first sub-circuit including a resistor and a first non-linear device electrically connected in parallel branches; and
      a second sub-circuit electrically connected in series with the first sub-circuit and to the other of the first and second ports, the second sub-circuit including a energy storage device and a second non-linear device electrically connected in parallel branches.

30. A vehicle as set forth in claim 29 wherein the snubber circuit receives a first current flowing from the first port through the first and second sub-circuits to the second port, wherein a substantial portion of the first current flows through the non-linear device when the first current flows through the first sub-circuit, and wherein the energy storage device charges when the first current flows through the second sub-circuit.

31. A vehicle as set forth in claim 29 wherein the energy storage device discharges when the contactor is closed, wherein the energy discharged from the energy storage device creates a second current that flows through the first sub-circuit opposite the first current, and wherein a substantial portion of the second current flows through the resistor when the second current flows through the first sub-circuit.

32. A vehicle as set forth in claim 30 wherein the first and second non-linear devices each includes a diode, and where the energy storage device includes a capacitor.

33. A method of suppressing arcing in a contactor circuit including a contactor having at least two contacts that make and break an electrical connection, the method comprising the acts of:
   providing a snubber circuit including a first sub-circuit and a second sub-circuit electrically connected in series, the first sub-circuit including a first branch having a resistor and a second branch having a first non-linear device, and the second sub-circuit having a third branch having a second non-linear device and a fourth branch having a storage device;
   electrically connecting the first sub-circuit to one end of the contactor circuit;
   electrically connecting the second sub-circuit to the other end of the contactor circuit;
   breaking the electrical connection of the contacts;
   generating a first current in response to the breaking of the electrical connection;
   allowing a substantial portion of the first current to flow through the non-linear device; and
   charging the energy storage device with energy of the first current.

34. A method as set forth in claim 33 and further comprising the acts of:
   after the charging act, making the electrical connection of the contacts;
   generating a second current in response to the making of the electrical connection, the second current flowing in an opposite direction of the first current; and
   allowing a substantial portion of the second current to flow through the resistor.

35. A method as set forth in claim 33 wherein the non-linear device includes a diode.

36. A method as set forth in claim 33 wherein the storage device includes a capacitor.

37. A method of suppressing arcing in a contactor circuit including a contactor having at least two contacts that make and break an electrical connection, the method comprising the acts of:
   providing a snubber circuit including a first sub-circuit and a second sub-circuit electrically connected in series, the first sub-circuit including a first branch having a resistor and a second branch having a non-linear device, and the second sub-circuit including a storage device;
   electrically connecting the first sub-circuit to one end of the contactor circuit;
   electrically connecting the second sub-circuit to the other end of the contactor circuit;
   breaking the electrical connection of the contacts;
   generating a first current in response to the breaking of the electrical connection;
   allowing a substantial portion of the first current to flow through the non-linear device; and
   charging the energy storage device with energy of the first current; and
   wherein the non-linear device is a first non-linear device, and wherein the second sub-circuit further includes a third branch having a second non-linear device and a fourth branch having the storage device.

38. A method as set forth in claim 37 and further comprising the acts of:
   breaking the electrical connection of the contacts a second time;
   generating a second current in an opposite direction of the first current in response to the breaking of the electrical connection the second time;
   allowing a substantial portion of the second current to flow through the second non-linear device; and
   allowing a substantial portion of the second current to flow through the resistor.

39. A method as set forth in claim 38 wherein the storage device includes a capacitor.

40. A method as set forth in claim 38 wherein the first and second non-linear devices include a first and second diode, respectively.

* * * * *